Feb. 2, 1932.　　　　　J. W. LEDOUX　　　　　1,843,330
FLUID MEASURING MECHANISM
Filed Dec. 3, 1924
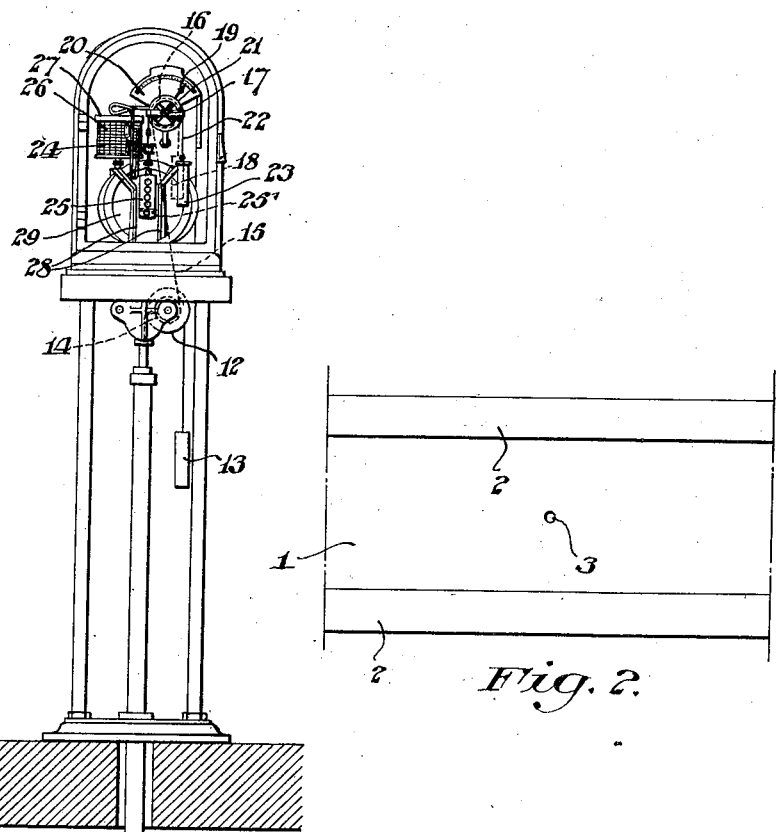
Fig. 2.
Fig. 3.
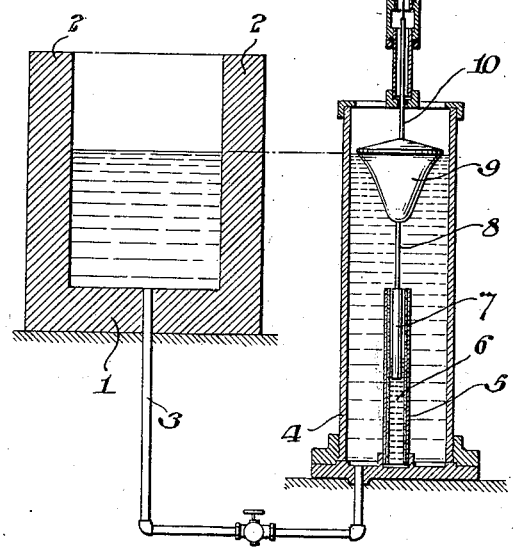
Fig. 1.
Inventor
John W. Ledoux,
By [signature]
Attorney.

Patented Feb. 2, 1932

1,843,330

UNITED STATES PATENT OFFICE

JOHN W. LEDOUX, OF SWARTHMORE, PENNSYLVANIA, ASSIGNOR, BY MESNE ASSIGNMENTS, TO SIMPLEX VALVE & METER COMPANY, OF PHILADELPHIA, PENNSYLVANIA, A CORPORATION OF DELAWARE

FLUID MEASURING MECHANISM

Application filed December 3, 1924. Serial No. 753,581.

My invention contemplates metering a flow of liquid through an open channel by varying the position of the meter mechanism in accordance with the depth of water in said channel.

The characteristic features of my improvements will more fully appear from the following description and the accompanying drawings in illustration thereof.

In the drawings, Fig. 1 is a partly diagrammatic vertical sectional view of apparatus illustrating an embodiment of my invention; Fig. 2 is a top plan view of a section of the open channel shown in Fig. 1; and Fig. 3 is a top plan view of a section of a modified form of channel.

As illustrated in Figs. 1 and 2 of the drawings, an open channel or flume comprising a bottom 1, and parallel walls 2, communicates through a conduit 3, with an open casing 4, in which is fixed a reservoir 5, open at the top and containing a column of heavy liquid, as mercury 6, of uniform cross section.

A float 7 of uniform cross section is immersed in the mercury 6, and connected by a stem, 8, with a shaped float 9, of variable cross section adapted to be immersed in the fluid supplied to the casing 4, from the channel through the conduit 3; the surface of the fluid in the casing 4 being at the level of and varying with the level of the fluid in the channel.

The float 9 has connected therewith a rod 10 to which is secured a tension member 11 passing over the periphery of a journalled sheave 12 and having on its other end a counterweight 13. A smaller sheave 14 fixed to the sheave 12 has fixed thereto a tension member 15 which passes over a sheave 16 to the journalled shaft 17, a counterweight 18 being fixed to the member 16.

A pointer 19 is connected with the shaft 17 and is movable thereby over the dial 20 uniformly graduated to indicate the rate of flow in gallons per hour or any desired units.

A sheave 21 is fixed to and operated by the shaft 17 to operate a tension member 22 having on one end a counterweight 23 and on the other end a recording marker 24 and a register 25. The recording marker makes constant contact with a chart 26 fixed to and rotated at a constant rate by a constantly rotating cylinder 27.

The register 25 is vertically reciprocable in guides 28 and has a usual traction wheel 25' engaging the constantly revolving disc 29 between its center and periphery to operate the register mechanism.

I have found that the flow of liquid in a flume or open channel having its bottom and sides plane surfaces and constant downstream conditions from the point of measurement will increase as the depth of liquid increases and always bear a constant ratio to a constant exponent of said depth, i. e. to $d^n$, at the point of measurement. When there is no flow in the channel, it is empty and the float 7 falls to its position of maximum submergence in the mercury 6, due to the negative buoyance, or weight, of the float 9, with its connected mechanism. When the liquid flow in the channel begins or increases, the surface level of liquid in the casing 4, rises, thereby buoying up float 9, and lifting same. The force of said lift is counteracted by the negative buoyancy of the float 7, the float 9 being so shaped that its rise will be in direct ratio to a constant exponent of the depth, i. e. $d^n$ and therefore in direct ratio to the flow of liquid through said channel. The float 9 and the buoyancy float 7 are connected together and transmit their movement to the sheave 12 which operates an indicator, a totalizing register and a recorder, as above described.

In Fig. 3, I have shown a channel having its bottom and sides plane surfaces, the channel being of variable cross-section and containing a Venturi throat. A tube 3 connects the center of the throat with a reservoir 4 and the surface level of fluid therein is varied by variations in the depth of liquid flowing in the channel 3 to operate metering mechanism as above described.

While I have shown channels of rectangular cross section, my invention is not limited to this as my improvements are applicable to a channel or flume of triangular, trapezoidal, semicircular or parabolic cross section.

What I have accomplished is the invention of a meter mechanism that will measure the flow through an open channel by utilizing only the depth of fluid in said channel. It will be understood that when the meter is connected with the channel at a particular place no changes can be permitted in conditions affecting flow downstream from the point of connection of the metering mechanism after it has been calibrated or put in function, and the variations in flow must result from supplying the channel with more or less water upstream from the metering mechanism.

While I have shown float 9 shaped and float 7 cylindrical, which is the preferred form, the same results may be accomplished by making the float 9 cylindrical and the float 7 shaped.

The formula for flow which I have devised to be used with my metering mechanism is $Q = c\, d^n$ in which, $Q$ = the unit of flow of liquid per unit of time.
$d$ = the depth of liquid in said channel.
$c$ = a figure that will remain constant for any particular shape of channel or location of the meter register.
$n$ = an exponental figure that will remain constant for any particular shape of channel or location of the meter register.

It must be understood, however, that both $c$ and $n$ will differ for channels differing in size or shape, but will remain constant for varying depths for any particular size or shape of channel, be it rectangular, triangular, trapezoidal or curved. The contour of the shaped float required for a particular channel may be readily determined by ascertaining the flow for two depths, from which the coefficient and exponent can be calculated and used for all depths.

By an open channel I mean a channel wherein flow is not restricted by contact with walls completely surrounding the fluid, regardless of whether the channel be covered or uncovered.

Having described my invention, I claim:

1. The combination with a channel, of metering mechanism comprising a compound float having one portion thereof of constant cross-section and another portion of variable cross-section so shaped that its movement will be in direct ratio to a constant exponent of the depth, said float being movable a distance having a direct ratio to the flow of said liquid by variations in the depth of a vertically unobstructed liquid flowing in said channel.

2. The combination with means forming a channel providing constant downstream conditions from a point of measurement of a vertically unobstructed stream flowing through said channel, of means comprising a float variably submerged with variations in the depth of flow in such channel for measuring flow therethrough.

3. The combination with means forming a channel having its bottom and sides plane surfaces and providing constant downstream conditions from a point of measurement of a vertically unobstructed stream flowing through said channel, of means comprising a float variably submerged by variations in the depth of flow in such channel and having a shape giving thereto a movement in direct ratio to a constant exponent of the depth of the stream in said channel, and measuring mechanism actuated by the movement of said float.

4. Mechanism for the measurement of a stream having a flow variable in direct ratio to a constant exponential function of its depth, which comprises a channel maintaining constant vertically unobstructed downstream conditions for said stream from a point of measurement, means comprising a variably submerged member operable by variations in the depth of said stream for metering its flow, and means actuable to variably submerge said member.

5. Mechanism for the measurement of a stream having a flow variable in direct ratio to a constant exponential function of its depth, which comprises a channel maintaining constant vertically unobstructed downstream conditions for said stream from a point of measurement, means comprising a variably submerged member operable by variations in the depth of said stream above the point of measurement for metering its flow, and means actuable to variably submerge said member.

6. Metering mechanism comprising an open channel, a casing communicating with said channel and containing liquid variable in volume with variations in flow in said channel, said casing being so positioned that the level of liquid therein will vary in proportion to the depth of liquid in the channel, a reservoir in said casing containing a liquid of different density from the liquid in said channel, connected floats one of which is immersed in the liquid in the casing and the other of which is immersed in the liquid in the reservoir, one of said floats being shaped so as to move in direct ratio with variations in the depth of a vertically unobstructed stream of liquid flowing in said channel, and mechanism operable by said floats to directly indicate the flow in said channel.

Signed at Philadelphia, in the county of Philadelphia and State of Pennsylvania, this first day of December, 1924.

J. W. LEDOUX.